United States Patent Office 3,245,639
Patented Apr. 12, 1966

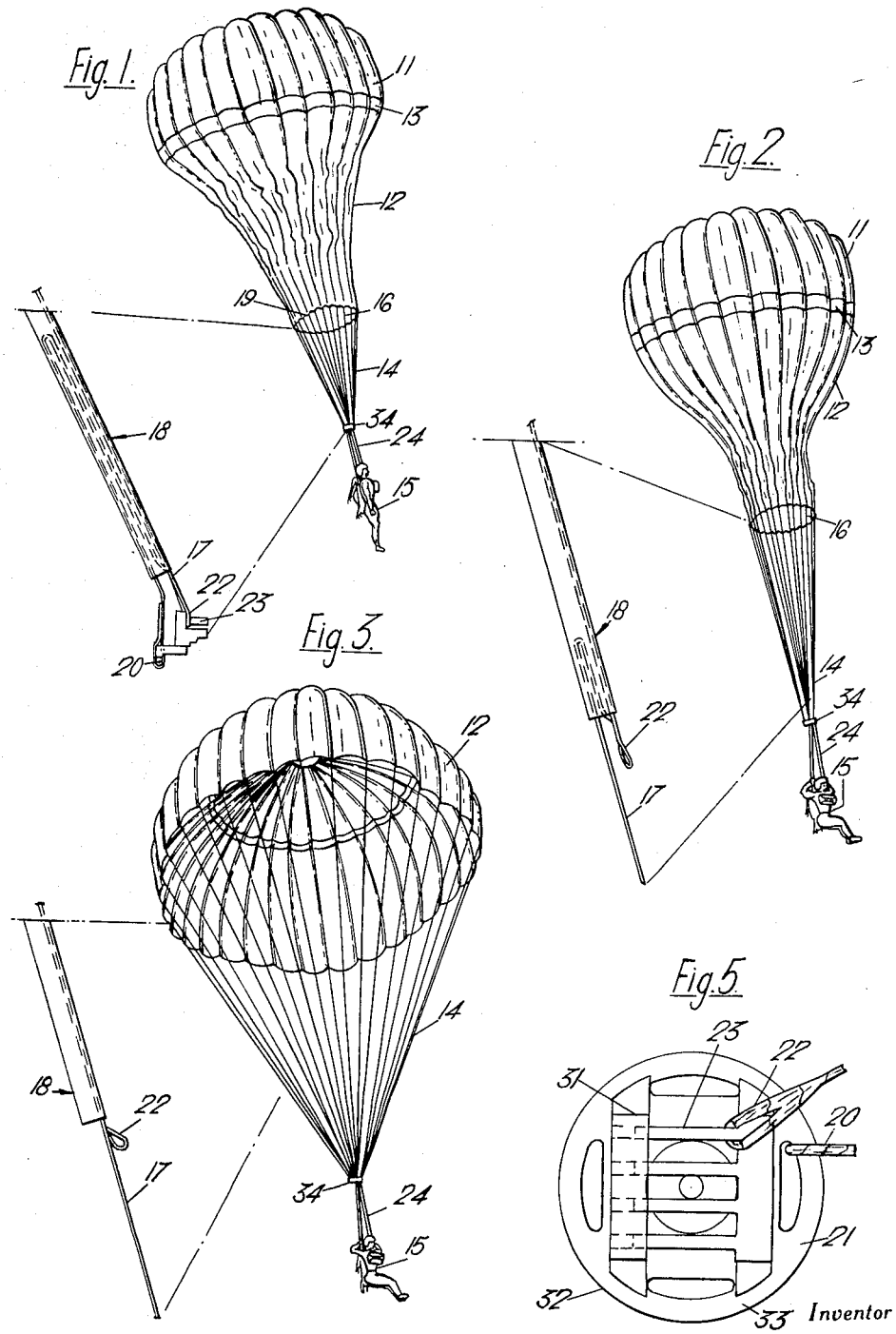

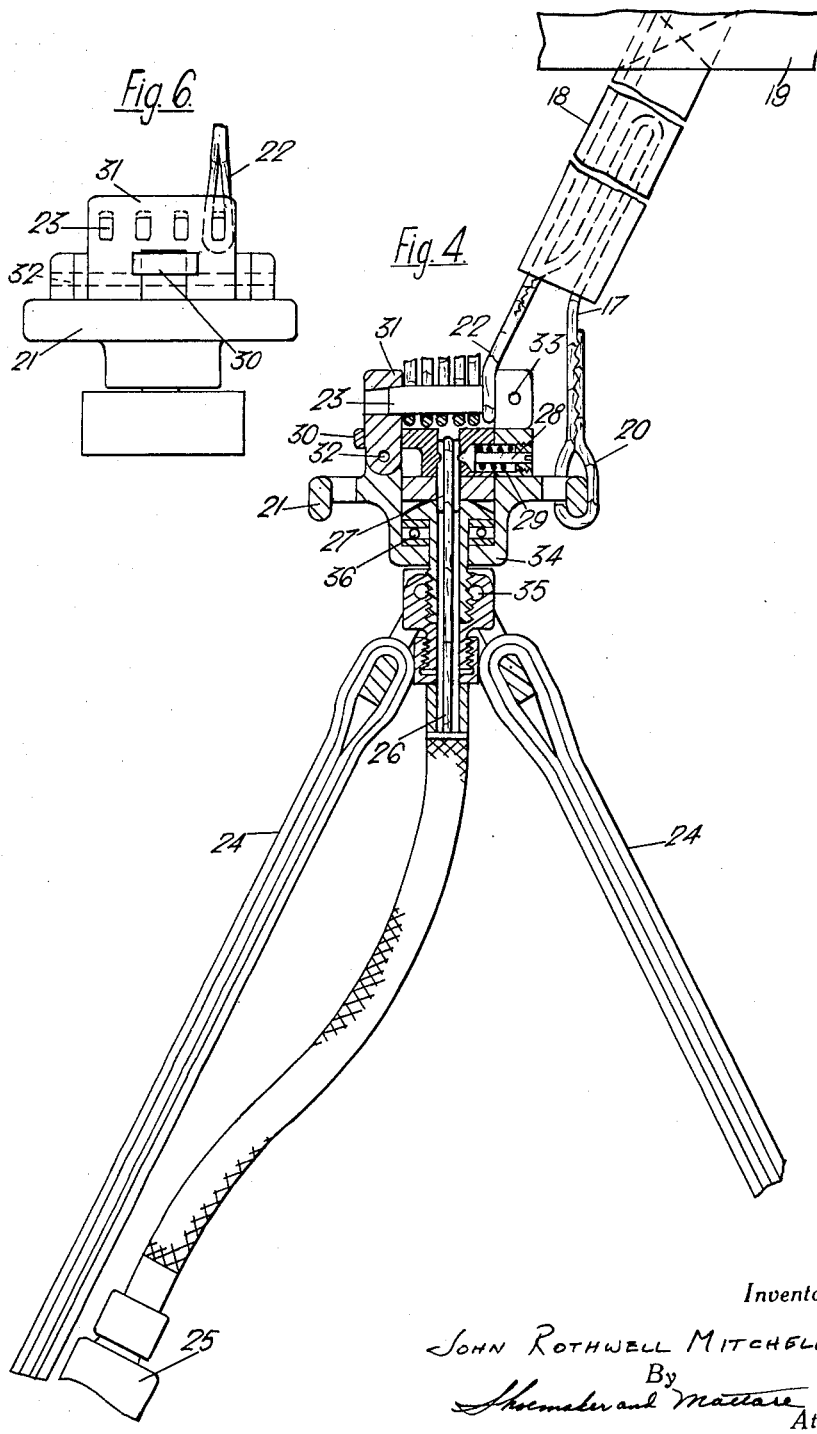

3,245,639
REEFING MEANS FOR PARACHUTES
John Rothwell Mitchell, Woking, Surrey, England, assignor to G.Q. Parachute Company Limited, Surrey, England, a British company
Filed June 29, 1964, Ser. No. 378,546
Claims priority, application Great Britain, July 17, 1963, 28,229/63
13 Claims. (Cl. 244—152)

This invention relates to parachutes and is particularly concerned with parachutes which are used in reefed and in de-reefed conditions.

When a parachute is used in the reefed state, there is difficulty from the canopy fluttering and giving a variation in the amount of drag and in the user rotating and entangling the reefed canopy.

The object of this invention is to provide a parachute the canopy of which has a stable drag form when in the reefed condition and has a simple and cheap form of de-reefing which does not require a complicated rigging system.

A parachute according to the invention comprises a canopy and rigging lines for connecting the canopy to a load, such as a parachutist, in which the rigging lines are connected to the load through a swivel race or rotatable connection and the canopy is made in two sections, a crown section and a skirt section, which are separated by a circumferential slot and means are provided whereby the mouth of the skirt section can be held in a reefed state so that the crown only is inflated.

Again according to the invention a parachute comprises a canopy and a number of rigging lines for connecting the canopy to a load, such as a parachutist, in which the mouth of the canopy is restrained in a reefed state by allowing a portion only of the rigging lines to become effective and in which the rigging lines are connected to the load through a swivel race or rotatable connection and means are provided whereby the rigging lines can be released to their full lengths while the parachute is in flight.

According to a further feature, a parachute, according to the invention comprises a canopy and rigging lines for connecting the canopy to a load, such as a parachutist, in which the rigging lines are connected to the load through a swivel race or rotatable connection and means are provided to restrain the mouth of the canopy to reef the parachute, and to release the restraint while the parachute is in flight, in which the means to release the restraint is controlled by operating means which pass through the center of the swivel race or rotatable connection.

According to a still further feature of the invention a parachute, according to the invention comprises a canopy and rigging lines for connecting the canopy to a load, such as a parachutist, in which the rigging lines are connected to the load through a swivel race or rotatable connection and the canopy can be held in a reefed state by allowing a portion only of the rigging lines to become effective, and in which the rigging lines are provided with loops part way along their lengths which loops engage arms on the swivel race or rotatable connection and means are provided to allow the arms to release the said loops so that the rigging lines attain their full effective lengths and allow the canopy to deploy to its full size.

The rigging lines may be shortened by holding part of each line in a folded condition until it is desired to release it to its full length and the folded parts of the lines may be housed in sleeves which could be loose on the rigging lines, or could be attached to the hem of the canopy, to the rigging lines or to the release unit.

The above and other features of the invention will be better understood from the following description of one form of parachute according to the invention which is described with reference to the attached drawings of which FIGURE 1 shows the parachute in flight in the reefed state, FIGURE 2 shows the parachute in flight after the rigging lines have been released but before the canopy is fully deployed, FIGURE 3 shows the parachute fully deployed, FIGURE 4 shows the means of attaching the parachute to the parachutist and the means for holding the rigging lines in the shortened condition and FIGURES 5 and 6 show details of the rotatable connection or swivel race.

As shown in FIGURES 1, 2, and 3 the parachute comprises a canopy having a crown section 11 and a skirt section 12 which are separated by a circumferential slot 13. The slot 13 can be made by butting the skirt section to the crown section and stitching the sections together at points only along the join, for example where the rigging lines pass, but a space or an overlap between skirt and crown could be used. The parachutist 15 is connected to the canopy by rigging lines 14, swivel race 34 and lift webs 24. The rigging lines can be continuous from the swivel race 34 to the apex of the crown of the canopy or can be joined at any point, for example at the lower or the upper hem of the skirt, at the hem of the crown or elsewhere as may be desired. The rigging lines should be attached to the canopy at least at the top and bottom hems of the skirt and at the lower hem of the crown. The rigging lines can pass through tunnels formed by or along the seams of the canopy and can terminate at a vent ring in the top of the crown or can pass right across the apex of the canopy. In each of the FIGURES 1, 2, and 3 one rigging line 17 is illustrated to show the positions of the parts of the rigging lines at each stage of operation of the reefing. As shown in FIGURE 1 the rigging line is in its shortened state with the line folded in a sleeve 18 which sleeve is attached to the hem 19 of the skirt 12 of the canopy, and the loop 22 in the line 17 held on the arm 23 of the swivel race 34. The mouth 16 of the parachute is in its restricted state and the crown only of the canopy is inflated by air which passes into the crown through the slot 13 as well as through the mouth 16. As shown in FIGURE 2 the rigging line has been released and is being pulled from the sleeve 18. The skirt of the canopy is beginning to inflate. In FIGURE 3 the lines are shown fully extended and the canopy is fully inflated. In this embodiment the sleeves 18 are attached to the hem of the skirt, but the sleeves could be loose on the rigging lines or could be attached to the rigging lines or to the release unit, for example they could be attached to the loops 22 or to the loops 20.

The operation of the release unit will be better understood from FIGURES 4, 5, and 6. The rigging line 17 is shown folded in its sleeve 18 which is attached by stitching or the like to the hem 19 of the canopy. The end 20 of the rigging line is attached to the frame 21 of the swivel race 34. The lift webs 24 of the harness of the parachutist are also attached to the swivel race, 34. The loop 22 of the rigging line 17 is held with similar loops on other rigging lines, on one of the arms 23 of the release device. The arms 23 are held in the closed position by latch 31 which is pivoted at 32 and held closed by slider 30. The slider 30 is prevented from moving by stop 27 which is held by plunger 28. When the release mechanism 25 is operated, which can be effected manually or by a time or barometric initiated control or by other means as desired, the cable 26 pulls the stop 27 from its position as shown in the path of the slider 30. The slider 30 is moved to the left by the spring 29 which moves latch 31, or allows latch 31 to be moved, out of the path of the arms 23. The latch 31 rotates about pivot 32. The arms 23 are released and are swung, by the pull on the loops 22, about the pivot 33 to allow the loops to slide off the arms 23. The rigging lines extend to their full lengths and the canopy is allowed to inflate to its full size.

The release cable 26 passes through the center of the swivel race 34. This race 34 is provided with bearings, such as the ball races shown at 35, 36 to allow the parachute and rigging lines to rotate relative to the lift webs 24. Whether the canopy is reefed or de-reefed, the user is able to swivel underneath the parachute, and as the crown of the canopy is always inflated there will be a positive unturning movement should be chance a twist form in the arrangement but such turning motion cannot prejudice the functioning of the dereefing system.

The skirt and crown of the canopy may be made of the same type of material or of different materials as desired. In the preferred embodiment the crown is made of strong canopy fabric and the skirt of lighter fabric. More than one circumferential slot may be provided and the canopy may incorporate ring slot or ribbon construction as desired to either the crown, or the skirt or to both crown and skirt.

As stated above in the preferred embodiment a light fabric is used for the skirt. For this, double chain stitching was used instead of the normal lock stitching. Double chain stitching gives faster production, greater flexibility of seam and ease of unpick for repair and other purposes, and permits the use of finer threads than have been used in the past for parachutes. As the threads are used in large cops, the storage and the handling of thread is facilitated. No bobbins are needed. We have found that this form of stitching can be used for seams, both cross and main and for peripheral and vent hems on many, if not all, types and designs of parachute.

As described above the parachute according to the invention is reefed by shortening of the rigging lines, but the invention is not restricted to this form of reefing. As the amount of air entering the mouth of the canopy to keep the crown inflated is not critical any other form of reefing could be used so long as the controlling means could pass through the center of the swivel. If, for example, an electrically controlled release is used for the reefing, slip rings could be provided in the swivel race while if a hydraulic system is used low friction glands would possibly be required to enable the swivel race to function.

If ring slot construction is used for the parachute, netting could be inserted in the rings. The netting gives rapid inflation of the canopy while maintaining excellent stability characteristics. A bobbin net could be employed which gives stretch along the center of the gore and enables lightweight fabric to be used without reinforcements.

Having described my invention, what I claim as new and desire to secure by Letters Patent is:

1. A parachute comprising a canopy and rigging lines for connecting the canopy to a load, such as a parachutist, a swivel race connecting said rigging lines to said load, said canopy comprising a crown section and a skirt section, separated by a circumferential slot, means for holding the mouth of the skirt section in a reefed state whereby the crown only is inflated, and means carried by said swivel race for releasing said reefed state so that the skirt section is also inflated.

2. A parachute comprising a canopy and a number of rigging lines for connecting the canopy to a load, such as a parachutist, means restraining the mouth of the canopy in a reefed state, said means holding a portion of each rigging line out of any supporting use and allowing a portion only of each rigging line to become effective, a rotatable connection between said rigging lines and said load, means permanently connecting said first named portion of each rigging line to said rotatable connection and separate means releasably connecting said second named portion of each rigging line to said rotatable connection, controllable means simultaneously releasing said rigging lines to their full effective lengths whereby the canopy may be fully inflated.

3. A parachute comprising a canopy and rigging lines for connecting the canopy to a load, such as a parachutist, a rotatable connection joining said rigging lines to said load, means restraining the mouth of the canopy to reef the parachute, and means to release the said restraining means while the parachute is in flight, and said last named means being mounted on said rotatable connection and manually operated by said parachutist.

4. A parachute comprising a canopy and rigging lines for connecting the canopy to a load, such as a parachutist, a rotatable connection joining said rigging lines to said load, means holding said canopy in a reefed state by allowing a portion only of the length of the rigging lines to become effective, said last named means including folded parts and loops in said rigging lines part way along their length, said rotatable connection having arms releasably mounted thereon, said arms engaging said loops to hold said canopy in said reefed state, and means operable to release said arms and de-reef said rigging lines and permit them to attain their full effective lengths and allow the canopy to deploy to its full size.

5. A parachute as claimed in claim 4, wherein the said means operable to release said arms is centrally located in said rotatable connection.

6. A parachute as claimed in claim 4, wherein said means operable to release said arms includes a slider member and a stop member in the path thereof, and cable means for pulling the stop out of the path of the slider member.

7. A parachute as claimed in claim 6 wherein said slider carries a latch, and said latch cooperates with said arms to retain them in operative position.

8. A parachute as claimed in claim 7 wherein said arms are pivotally mounted on said rotatable connection.

9. A parachute as claimed in claim 7 wherein said latch is pivoted to said rotatable connection.

10. A parachute as claimed in claim 4, wherein said de-reefing means is initiated by a barometrically operated control.

11. A parachute as claimed in claim 1, wherein the circumferential slot is formed by connecting the skirt to the crown at points only where the rigging lines are attached to the canopy.

12. A parachute as claimed in claim 11, said crown and skirt having adjacent spaced aligned hems, and said rigging lines being attached thereto.

13. A parachute as claimed in claim 4, said skirt and crown sections being made of materials of different strength.

References Cited by the Examiner

UNITED STATES PATENTS

| | | | |
|---|---|---|---|
| 1,427,771 | 9/1922 | Ball | 244—145 |
| 2,469,573 | 5/1949 | Quilter | 244—152 |
| 2,520,931 | 9/1950 | Heinrich | 244—152 |
| 2,754,074 | 7/1956 | Schade | 244—152 |

MILTON BUCHLER, *Primary Examiner.*

ALFRED E. CORRIGAN, *Examiner.*